(12) United States Patent
Qin

(10) Patent No.: US 11,318,958 B2
(45) Date of Patent: May 3, 2022

(54) VEHICLE DRIVING CONTROL METHOD, APPARATUS, VEHICLE, ELECTRONIC DEVICE AND STORAGE MEDIUM

(71) Applicant: Beijing Baidu Netcom Science Technology Co., Ltd., Beijing (CN)

(72) Inventor: Wenchuang Qin, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/507,131

(22) Filed: Oct. 21, 2021

(65) Prior Publication Data

US 2022/0041178 A1    Feb. 10, 2022

Related U.S. Application Data

(63) Continuation of application No. 17/352,900, filed on Jun. 21, 2021, now abandoned.

(30) Foreign Application Priority Data

Nov. 30, 2020    (CN) .......................... 202011380676.X

(51) Int. Cl.
*B60W 60/00*    (2020.01)
*B60W 50/06*    (2006.01)
*B60W 50/00*    (2006.01)

(52) U.S. Cl.
CPC .......... *B60W 60/001* (2020.02); *B60W 50/06* (2013.01); *B60W 2050/0083* (2013.01)

(58) Field of Classification Search
CPC ............... B60W 50/06; B60W 60/001; B60W 2050/0083

(Continued)

(56) References Cited

U.S. PATENT DOCUMENTS 10,943,367 B1 *    3/2021    Robinson ............... B60W 50/00
11,180,145 B2 *    11/2021    Zhu ........................ G05D 1/0223
(Continued)

FOREIGN PATENT DOCUMENTS

| CN | 109664886 A | * | 4/2019 | ............ B60W 30/00 |
| JP | 2021511996 A | * | 5/2021 | ............ B60W 10/18 |
| WO | WO-2019228211 A1 | * | 12/2019 | ......... G06K 9/00664 |

*Primary Examiner* — Atul Trivedi
(74) *Attorney, Agent, or Firm* — Tucker Ellis LLP; Tanya S. Gaylord

(57) ABSTRACT

The present application discloses a vehicle driving control method, an apparatus, a vehicle, an electronic device and a storage medium, relates to artificial intelligence, automatic driving and intelligent transportation in computer technology. Including: dividing a preset driving time period of a vehicle, to acquire multiple driving time points, successively acquiring driving information at a first time point in adjacent driving time points, acquiring driving information at a second time point in the adjacent driving time points according to the driving information at the first time point and a pre-configured driving control amount, calibrating the driving control amount according to the driving information at the first time point and the driving information at the second time point, and determining a driving path between the adjacent driving time points based on the calibrated driving control amount, and controlling a driving of the vehicle according to the driving path.

20 Claims, 4 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 2010/0256836 | A1* | 10/2010 | Mudalige | G08G 1/164 |
| | | | | 701/25 |
| 2014/0136414 | A1* | 5/2014 | Abhyanker | G05D 1/0011 |
| | | | | 701/25 |
| 2018/0373250 | A1* | 12/2018 | Nakamura | G05D 1/0257 |
| 2019/0120946 | A1* | 4/2019 | Wheeler | H04N 13/106 |
| 2019/0179320 | A1* | 6/2019 | Pacala | G05D 1/0214 |
| 2019/0302761 | A1* | 10/2019 | Huang | G05D 1/0221 |
| 2019/0318481 | A1* | 10/2019 | Chen | G06T 7/73 |
| 2019/0337530 | A1* | 11/2019 | Hiramatsu | G05D 1/0088 |
| 2020/0010095 | A1* | 1/2020 | Kim | B60W 50/14 |
| 2020/0062252 | A1* | 2/2020 | Parks | G01C 21/36 |
| 2020/0064846 | A1* | 2/2020 | Chen | G01C 21/32 |
| 2020/0070845 | A1* | 3/2020 | Zhang | B60W 40/10 |
| 2020/0101979 | A1* | 4/2020 | Moshchuk | G05D 1/0212 |
| 2020/0111362 | A1* | 4/2020 | Sohn | G08G 1/166 |
| 2020/0122740 | A1* | 4/2020 | Fritzson | B60W 50/0098 |
| 2020/0156631 | A1* | 5/2020 | Lin | G05D 1/0251 |
| 2020/0172115 | A1* | 6/2020 | Zhu | B60W 30/10 |
| 2020/0180657 | A1* | 6/2020 | Iwamoto | G05D 1/0088 |
| 2020/0293796 | A1* | 9/2020 | Sajjadi Mohammadabadi | |
| | | | | G06V 20/56 |
| 2020/0298842 | A1* | 9/2020 | Takamatsu | B60W 30/09 |
| 2020/0298877 | A1* | 9/2020 | Takamatsu | G01S 13/931 |
| 2020/0339134 | A1* | 10/2020 | Pennala | B60W 50/0205 |
| 2021/0224560 | A1* | 7/2021 | Kim | G06V 20/58 |
| 2021/0229704 | A1* | 7/2021 | Zhu | B60W 50/06 |
| 2021/0276571 | A1* | 9/2021 | Breton | B60W 10/06 |
| 2021/0309250 | A1* | 10/2021 | Wenchuang | B60W 60/001 |

\* cited by examiner

VEHICLE DRIVING CONTROL METHOD, APPARATUS, VEHICLE, ELECTRONIC DEVICE AND STORAGE MEDIUM

CROSS-REFERENCE TO RELATED APPLICATIONS

This application is a continuation application of U.S. patent application Ser. No. 17/352,900, filed Jun. 21, 2021, which claims priority to Chinese Patent Application No. 202011380676.X, which was filed with the China National Intellectual Property Administration on Nov. 30, 2020 and titled "vehicle driving control method, apparatus, vehicle, electronic device and storage medium". The disclosures of these patent applications are incorporated herein by reference in their entireties.

TECHNICAL FIELD

The present application relates to artificial intelligence, automatic driving, and intelligent transportation in computer technology, in particular to a vehicle driving control method, an apparatus, a vehicle, an electronic device, and a storage medium.

BACKGROUND

A path planning technique is one of the important techniques of vehicle driving control technology, based on a range for a path planning, the path planning may be divided into a global path planning (e.g., a navigation path of the vehicle driving from point A to point B) and a local path planning (e.g., a driving trajectory of the vehicle within a shorter distance, e.g., 200 meters, or within a certain time period, e.g., 5 seconds).

SUMMARY

The present application provides a vehicle driving control method, an apparatus, a vehicle, an electronic device, and a storage medium, for improving driving reliability of the vehicle.

According to a first aspect of the present application, there is provided a vehicle driving control method, the method includes:

dividing a preset driving time period of a vehicle, to acquire multiple driving time points;

successively planning a driving path between adjacent driving time points, to acquire the driving path between the adjacent driving time points, and controlling a driving of the vehicle according to the driving path;

where the planning the driving path between the adjacent driving time points includes:

acquiring driving information at a first time point in the adjacent driving time points, acquiring driving information at a second time point in the adjacent driving time points according to the driving information at the first time point and a pre-configured driving control amount; where the first time point is earlier than the second time point;

calibrating the driving control amount according to the driving information at the first time point and the driving information at the second time point, and determining the driving path between the adjacent driving time points based on the calibrated driving control amount.

According to a second aspect of the present application, there is provided a vehicle driving control apparatus, the apparatus includes:

a dividing module, configured to divide a preset driving time period of a vehicle, to acquire multiple driving time points;

a planning module, configured to successively plan a driving path between adjacent driving time points, to acquire the driving path between the adjacent driving time points;

a controlling module, configured to control a driving of the vehicle according to the driving path;

where the planning module is configured to, acquire driving information at a first time point in the adjacent driving time points, acquire driving information at a second time point in the adjacent driving time points according to the driving information at the first time point and a pre-configured driving control amount; where the first time point is earlier than the second time point; calibrate the driving control amount according to the driving information at the first time point and the driving information at the second time point, and determine the driving path between the adjacent driving time points based on the calibrated driving control amount.

According to a third aspect of the present application, there is provided an electronic device, including:

at least one processor; and a memory communicatively connected with the at least one processor; where, the memory stores an instruction executable by the at least one processor, and the instruction is executed by the at least one processor to enable the at least one processor to execute the methods as descried in the first embodiment above.

According to a fourth aspect of the present application, there is provided a vehicle, including: the apparatus as described in the second embodiment above, or the electronic device as described in the third embodiment above.

According to a fifth aspect of the present application, there is provided a non-transitory computer-readable storage medium storing a computer instruction for enabling a computer to execute the methods as described in the first embodiment above.

It should be understood that contents described in this section is not intended to identify a key or important feature of an embodiment of the present application, and is not intended to limit scope of the present application. Other features of the present application will become easily to be understood through the following description.

BRIEF DESCRIPTION OF DRAWINGS

Figures are used for better understanding of the present solution, and do not constitute a limitation to the present application. Where.

DESCRIPTION OF EMBODIMENTS

Figure 1:
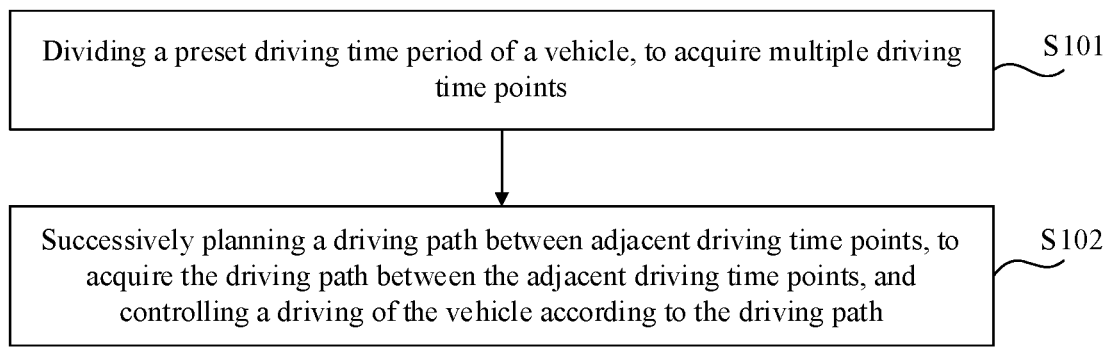
FIG. 1 is a schematic diagram according to a first embodiment of the present application.

In the prior art, methods for the local path planning mainly include a point scattering method, which specifically is that: the vehicle may set a point at which the vehicle is currently located as a starting point, perform point scattering operation in front of the vehicle in conjunction with a preset distance to obtain multiple curves composed of points obtained by the point scattering operation and the starting point, and select one curve from the multiple curves as a driving trajectory.

However, since the point scattering operation is implemented on a basis of the preset distance, comprehensiveness and reliability of the generated multiple curves may be relatively low, resulting in problems that the selected driving trajectory may be not adapted to a driving state (e.g., going straight on, turning, accelerating, and decelerating) of the vehicle, and the like, causing the vehicle being unable to drive along the driving trajectory, thereby rendering the problem of lower driving reliability of the vehicle.

Exemplary embodiments of the present application are illustrated below in conjunction with the drawings, where various details of the embodiments of the present application are included to facilitate understanding, and should be regarded as merely exemplary. Therefore, those of ordinary skill in the art should realize that various changes and modifications may be made to the embodiments described herein without departing from scope and spirit of the present application. Likewise, for clarity and conciseness, descriptions of well-known functions and structures are omitted in the following description.

It is worth noting that a path planning is one of the important techniques for controlling vehicle driving, and based on a range of a route for which a path planning is to be performed, the path planning is divided into two types: a global path planning and a local path planning.

Exemplarily, the global path planning is mainly used for a path planning for a route with a larger range, such as a path planning for a route with a longer distance, specifically, a path planning for the vehicle driving from point A to point B, namely a navigation path for the vehicle driving from point A to point B; or, a path planning for a route with a longer time, specifically, a path planning for a nearly half-hour route by the vehicle.

The local path planning is mainly used for a path planning for a route with a smaller range, such as a path planning for a route with a shorter distance, specifically, a path planning for a route within 200 meters by the vehicle, or a path planning for a route with a shorter time, specifically, a path planning for a route within 5 seconds by the vehicle.

It should be understood that the vehicle driving control method of the present embodiment may be implemented based on the global path planning, may also be implemented based on the local path planning. However, compared with the global path planning, the local path planning has a more refined requirement on a driving trajectory obtained by planning. Therefore, the vehicle driving control method of the present embodiment is more suitable to be based on the local path planning, which will be analyzed in more detail below in conjunction with principle of the vehicle driving control method of the present embodiment.

In related techniques, when the vehicle driving control method is implemented based on the local path planning, a method usually used is a point scattering method, for example, presetting a distance (referred to as a preset distance) for point scattering, that is, a distance between two adjacent points when performing the point scattering operation, and setting a point at which the vehicle is currently located as a starting point, performing the point scattering operation in front of the vehicle in conjunction with the preset distance, which specifically is that, four rows of points may be scattered in front of the vehicle, number of the points in each row may be multiple, for points in each row, a curve composed of the points in the row and the starting point may be obtained, and there are four curves in total, a path planning apparatus selects one curve from the four curves as a driving trajectory, and controls the vehicle to drive automatically based on the driving trajectory.

However, by adopting the solution in the above related techniques and implementing on a basis of the preset distance, coverage area of the scattered points is limited to a certain extent, thereby comprehensiveness and reliability of the generated multiple curves may be relatively low, and implementing determination of the driving trajectory on a basis of the preset distance is equivalent to pre-given the driving point of the vehicle, resulting in problems that the selected driving trajectory may be not adapted to a driving state (e.g., going straight on, turning, accelerating and decelerating) of the vehicle, causing the vehicle being unable to drive along the driving trajectory, thereby rendering lower driving reliability of the vehicle.

Through creative work, the inventor of the present application obtains an inventive conception of the present application: that is, determining driving information at following one time point in adjacent driving time points based on driving information at previous one time point in the adjacent driving points and a driving control amount, and calibrating the driving control amount based on the driving information at previous one time point and the driving information at following one time point, and determining a driving path between the adjacent driving time points based on the calibrated driving control amount, and controlling the driving of the vehicle based on the driving path, to realize a technical effect of improving driving safety and reliability of the vehicle.

A technical solution of the present application and how the technical solution of the present application solves the above technical problem will be described in detail below with specific embodiments. The following specific embodiments may be combined with each other, same or similar concepts or procedures may not be repeated in some embodiments. The embodiments of the present application will be described below in conjunction with the drawings.

Based on the above inventive conception, an embodiment of the present application provide a vehicle driving control method, applied to artificial intelligence, automatic driving, and intelligent transportation in computer technology, to achieve a technical effect of improving safe driving of the vehicle.

In an embodiment of the present application, by determining driving information at a second time point based on driving information at a first time point and a driving control amount, and calibrating the driving control amount based on the driving information at the first time point and the driving information at the second time point, and thereby determining a driving path between the first time point and the second time point through the calibrated driving control amount, accuracy and reliability of the determined driving path may be improved, thereby realizing a technical effect of safe controlling of the vehicle.

FIG. 1 is a schematic diagram according to a first embodiment of the present application, as shown in FIG. 1, the vehicle driving control method provided in the present embodiment includes:

S101: dividing a preset driving time period of a vehicle, to acquire multiple driving time points.

Exemplarily, an executive entity of the present embodiment may be a vehicle driving control apparatus, the vehicle driving control apparatus may be a vehicle, and specifically may be a computer, a processor, a vehicle-mounted terminal, and an internet of vehicle chip, etc., provided in the vehicle.

The preset driving time period may characterize information related to a time period when the vehicle is driving, such as 5 seconds, etc.

The driving time point may characterize information related to a time point when the vehicle is driving, such as a 1st second, etc.

Exemplarily, the vehicle driving control apparatus may set a time period for which a path planning is to be performed, and divide the time period into multiple driving time periods, and for each driving time period, may divide the driving time period into multiple driving time points.

Figure 2:
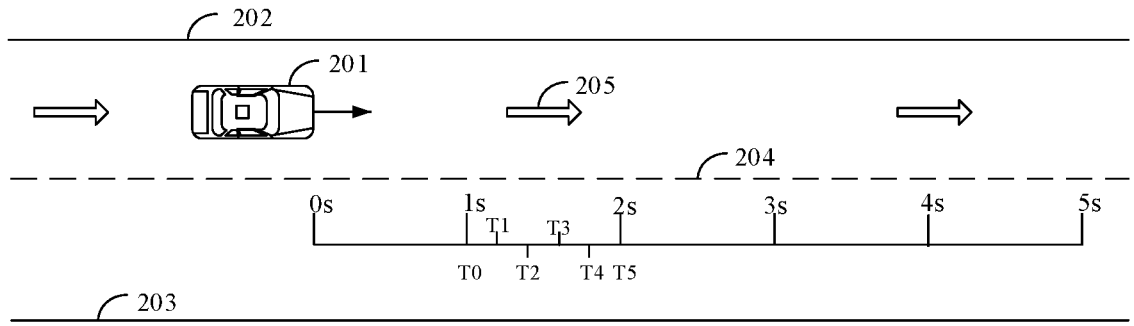
FIG. 2 is a schematic diagram of an application scenario according to an embodiment of the present application.

This step is described as follows in conjunction with an application scenario as shown in FIG. 2:

as shown in FIG. 2, a vehicle 201 is driving on a road, and specifically is driving on a left lane of the road, and a lane line 204 is included between the left lane 202 and a right lane 203.

When the vehicle driving control apparatus needs to perform planning on a path within 5 seconds (i.e., a time period for which a path planning is to be performed), it may divide 5 seconds into 5 driving time periods. For example, a current time is a starting time (0 s as shown in FIG. 2), a time from the starting time to a 1st second (1 s as shown in FIG. 2) is one driving time period, a time from the 1st second to a 2nd second (2 s as shown in FIG. 2) is another driving time period, and so on, which will not be enumerated herein.

For each driving time period, the driving time period may be divided into multiple driving time points, for example, for a driving time period from a 1st second to a 2nd second, the driving time period may be divided into 5 driving time points, and when dividing the driving time points, they may be divided equally, may also be divided randomly, and for different driving time periods, different dividing manners may be adopted.

Exemplarily, a driving time period from a 1st second to a 2nd second may be divided into 5 driving time points in an equally dividing manner, and a driving time period from the 2nd second to a 3rd second may be divided into 5 driving time points in a randomly dividing manner.

For example, as shown in FIG. 2, for a driving time period from a 1st second to a 2nd second, if the driving time period is divided into 5 driving time points equally, then 1 s is a first one time point T0 of the driving time period (i.e., a starting time point, which is the last time point of previous one driving time period), 2 s is the last one time point T5 of the driving time period (and is a first time point of a next driving time period), from the time point T0 to the time point T5, a time point T2, a time point T3, and a time point T4 as shown in FIG. 2 are also included.

S102: successively planning a driving path between adjacent driving time points, to acquire the driving path between the adjacent driving time points, and controlling a driving of the vehicle according to the driving path.

Where the planning the driving path between the adjacent driving time points includes the following steps:

step 1: acquiring driving information at a first time point in the adjacent driving time points, and acquiring driving information at a second time point in the adjacent driving time points according to the driving information at the first time point and a pre-configured driving control amount.

Where the first time point is earlier than the second time point.

The driving information at the time point may characterize information related to driving of the vehicle at the time point, such as a speed of the vehicle at the time point, etc. Accordingly, the driving information at the first time point may characterize information related to driving of the vehicle at the first time point, such as a speed of the vehicle at the first time point, etc.; the driving information at the second time point may characterize information related to driving of the vehicle at the second time point, such as a speed of the vehicle at the second time point, etc.

The driving control amount may characterize information related to controlling of a driving state of the vehicle, such as a steering wheel angle control amount and/or an acceleration control amount of the vehicle, etc.

In conjunction with the above example, this step may be understood as that: the vehicle driving control apparatus may determine driving information at a time point T1 based on driving information at a time point T0 and a driving control amount; it may also determine driving information at a time point T2 based on the driving information at the time point T1 and a driving control amount, and so on, which will not be enumerated herein.

It is worth noting that in the present embodiment, by determining the driving information at the second time point according to the driving information at the first time point and the driving control amount, the driving information between the adjacent driving time points may be made to be highly fitted, thereby achieving a technical effect of improving reliability and accuracy of the determined driving information.

Step 2: calibrating the driving control amount according to the driving information at the first time point and the driving information at the second time point, and determining the driving path between the adjacent driving time points based on the calibrated driving control amount.

In conjunction with the application scenario shown in FIG. 2 and the above example, after the vehicle driving control apparatus determines the driving information at the time point T1 based on the driving information at the time point T0 and the driving control amount, the vehicle driving control apparatus may calibrate the driving control amount based on the driving information at the time point T0 and the driving information at the time point T1, to obtain the calibrated control amount, and determine the driving path between the time point T0 and the time point T1 based on the calibrated control amount.

It is worth noting that in the present embodiment, by after obtaining the driving information at the second time point based on the driving control amount, calibrating the driving control amount based on the driving information at the first time point and the driving information at the second time point, thereby determining the driving path between the adjacent driving time points based on the calibrated driving control amount, reliability and accuracy of the determined driving path may be improved, thereby a technical effect of improving the driving safety of the vehicle when the vehicle is driving based on the driving path is realized.

Figure 3:
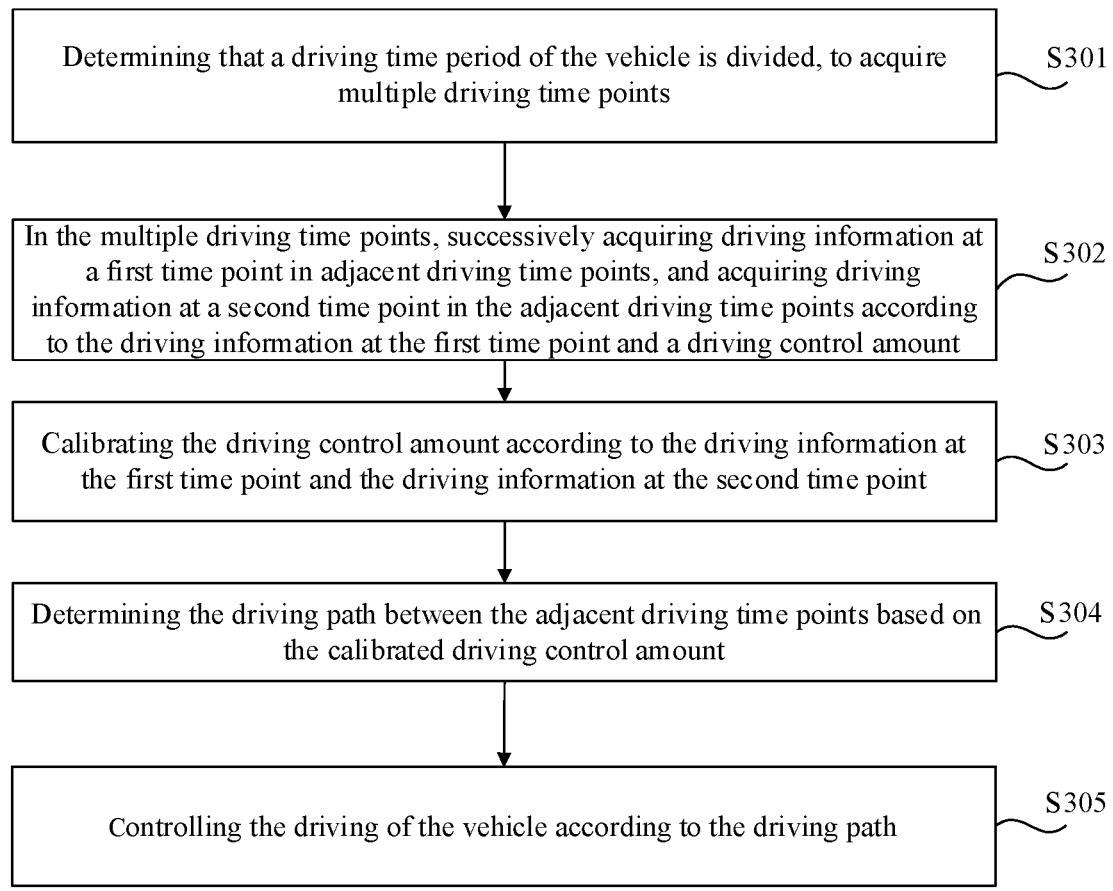
FIG. 3 is a schematic diagram according to a second embodiment of the present application.

FIG. 3 is a schematic diagram according to a second embodiment of the present application, as shown in FIG. 3, the vehicle driving control method provided in the present embodiment includes:

S301: determining that a driving time period of the vehicle is divided, to acquire multiple driving time points.

Exemplarily, for description of S301, reference may be made to S101, which will not be repeated herein in detail.

S302: in the multiple driving time points, successively acquiring driving information at a first time point in adjacent driving time points, and acquiring driving information at a second time point in the adjacent driving time points according to the driving information at the first time point and a driving control amount.

Where the first time point is earlier than the second time point.

In conjunction with the application scenario as shown in FIG. 2 and the above example, there are multiple driving time periods, in one example, different driving time periods correspond to different driving control amounts, that is, each driving time period corresponds to one driving control amount, respectively, and there is a one-to-one correspondence between the driving time period and the driving control amount.

In another example, different driving time periods correspond to a same driving control amount, that is, all driving time periods correspond to the same one driving control amount.

In yet another example, part of the driving time periods correspond to a same one driving control amount.

In some embodiments, S302 may include the following steps:

step 1: acquiring parameter attribute information of the vehicle, where the parameter attribute information characterizes a physical property of the vehicle.

The physical characteristic may characterize information related to a physical parameter associated with the vehicle, for example a mass of the vehicle's mass center.

Step 2: determining driving information at the second time point according to the driving information at the first time point, the driving control amount, and the parameter attribute information.

In other words, in the present embodiment, the vehicle driving control apparatus may combine information of three dimensions, to determine the driving information at the second time point, the parameter attribute information characterizes a physical characteristic of the vehicle, and by the solution of determining the driving information at the second time point in conjunction with the parameter attribute information in the present embodiment, the determined driving information at the second time point may be highly fitted with the physical characteristic of the vehicle, realizing a technical effect of improving reliability and accuracy of the determined driving information at the second time point.

In some embodiments, the driving information at the time point includes: a speed and an angle of the vehicle at the time point; the driving control amount includes: a steering wheel angle control amount and an acceleration control amount of the vehicle, step 2 may include the following sub-steps:

sub-step 1: determining an angle at the second time point according to the parameter attribute information, a speed at the first time point, and a steering wheel angle control amount.

Exemplarily, in some embodiments, a kinematics model and a dynamics model of the vehicle may be constructed in advance, and an angle and so on at the second time point may be determined according to the kinematics model and the dynamics model.

Since driving information at a time point may include information of two dimensions, that is, a speed and an angle of the vehicle at the time point, accordingly, the driving information at the first time point may include: a speed and an angle at the first time point, the driving information at the second time point may include: a speed and an angle at the second time point.

It is worth noting that the driving information at the time point in the present embodiment is merely used for exemplary illustration of what contents driving information at a time point might include, and cannot be understood as a limitation to the driving information at the time point, for example, in other embodiments, based on the above, driving information at a time point may also include a distance between the vehicle and a pre-configured reference line and so on at the time point.

Sub-step 2: determining an acceleration at the second time point according to the acceleration control amount.

Likewise, the acceleration at the second time point may be determined based on the kinematics model, the dynamics model, and the acceleration control amount.

Sub-step 3: determining a speed at the second time point according to the speed at the first time point, an angle at the first time point, and the acceleration at the second time point.

After determining the acceleration at the second time point, the speed at the second time point may be determined based on the speed at the first time point, the angle at the first time point, and the acceleration at the second time point.

It is worth noting that a speed of the vehicle in an initial state is 0, that is, when the vehicle starts to drive, the speed at the first time point is 0. And in conjunction with the above example, for two adjacent driving time periods, a speed at the first time point of following one driving time period may be determined according to a speed at the last one time point of previous one driving time period.

The kinematics model may be embodied by Formula 1 and Formula 2, $$\dot{x} = v \times \cos\theta \qquad \text{Formula 1:}$$

where $\dot{x}$ may represent a reciprocal of a distance of the vehicle in a abscissa direction (which is based on a world coordinate system of a road at which the vehicle is located), v may represent a speed of the vehicle, $\theta$ may represent an angle of the vehicle.

$$\dot{y} = v \times \sin\theta \qquad \text{Formula 2:}$$

where $\dot{y}$ may represent a reciprocal of a distance of the vehicle in a ordinate direction.

The dynamics model may be embodied by Formula 3 and Formula 4, Formula 3:

$$\dot{\theta} = \frac{v}{\left(L + mv^2 \frac{l_r C_r - l_f C_f}{2 C_r C_f L}\right)} \delta$$

where $\dot{\theta}$ may represent a change rate of an angle, that is, it may be understood as an angular velocity, L may represent a wheelbase of the vehicle, m may represent a mass of a mass center, $l_r$ may represent a distance between the mass center and a rear axle, $C_r$ may represent a cornering stiffness of a rear tire, $l_f$ may represent a distance between the mass center and a front axle, $C_f$ may represent a cornering stiffness of a front tire, $\delta$ may represent a steering wheel angle control amount.

$$\dot{v} = a \qquad \text{Formula 4:}$$

where $\dot{v}$ may represent an acceleration.

By solving the kinematics model and the dynamics model, driving information at a time point may be determined, such as, a speed and an angle and so on at the second time point may be determined.

In some embodiments, the kinematics model and the dynamics model may be solved through Runge-Kutta, to obtain driving information at a time point, for calculation principle of the Runge-Kutta, reference may be made to related technology, which will not be repeated herein in detail.

It is worth noting that in the present embodiment, by determining a speed and an angle of the vehicle at a time point (that is, driving information at the time point), it is possible to realize that the determined driving information at the time point has a higher richness, has a property of more comprehensive, thereby realizing a technical effect of accuracy and reliability of the path planning, then realizing a technical effect of the safe and reliable driving of the vehicle.

S303: calibrating the driving control amount according to the driving information at the first time point and the driving information at the second time point.

In some embodiments, S303 may include: calibrating the driving control amount according to the driving information at the first time point, the driving information at the second time point, and a pre-configured reference line, to acquire the calibrated driving control amount.

The reference line may characterize a reference basis of the vehicle during a driving procedure, and a determination of the reference line may be determined based on a driving state of the vehicle.

For example, if the driving state of the vehicle is going straight on, the reference line may be a center line 205 as shown in FIG. 2; in another example, if the driving state of the vehicle is turning, the reference line may be a left lane line or a right lane line, specifically, if the driving state of the vehicle is turning left, the reference line may be the left lane line, if the driving state of the vehicle is turning right, the reference line may be the right lane line.

It is worth noting that in the present embodiment, by calibrating the driving control amount in conjunction with the reference line, the vehicle may drive based on the reference line as much as possible, thereby improving a technical effect of driving safety and reliability of the vehicle.

In some embodiments, S303 may include the following steps:

step 1: determining a trajectory to be matched corresponding to the driving information at the first time point and the driving information at the second time point.

The trajectory to be matched may characterize a trajectory corresponding to the adjacent driving time points, after adaptively adjusting the trajectory, a trajectory (that is, driving trajectory) suitable for the driving of an autonomous vehicle may be obtained.

Step 2: determining deviation information between the reference line and the trajectory to be matched.

In some embodiments, step 2 may include: determining a distance between the trajectory to be matched and the reference line, and determining the deviation information according to the driving control amount and the distance between the trajectory to be matched and the reference line.

The distance between the trajectory to be matched and the reference line may include: a distance between the trajectory to be matched and the reference line in an abscissa direction, and a distance between the trajectory to be matched and the reference line in an ordinate direction.

It is worth noting that in the present embodiment, compared with determining the deviation information based on the distance between the trajectory to be matched and the reference line, by determining the deviation information in conjunction with the driving control amount and the distance between the trajectory to be matched and the reference line, factors that may affect reliability of the deviation information are increased, leading to a technical effect of improving reliability and accuracy of the deviation information.

In some embodiments, the method for determining the deviation information may include: calculating a trajectory prediction value between the adjacent driving time points according to the driving control amount and the distance between the trajectory to be matched and the reference line, and determining the deviation information according to the trajectory prediction value, and a preset expected value corresponding to the reference line.

It is worth noting that by determining the trajectory prediction value and determining the deviation information in conjunction with the trajectory prediction value and the expected value, the deviation information may embodies the deviation between the vehicle and the reference line more accurately, leading to a technical effect of improving reliability and accuracy of the determined deviation information.

In some embodiments, a cost function for determining the deviation information may be constructed, and the deviation information may be determined based on the cost function, the cost function may be expressed by Formula 5, Formula 5:

$$\min_{x,u} \sum_{k=0}^{N-1} \|f(x_k, u_k) - \tilde{y}_k\|_{W_k}^2 + \|f(x_N, u_N) - \tilde{y}_N\|_{W_N}^2$$

where k may represent a time interval between two adjacent driving time periods, N may represent number of driving time periods, $\tilde{y}_k$ may represent an expected value corresponding to the k-th time interval, $W_k$ may represent a weight corresponding to the k-th time interval, $\tilde{y}_N$ may represent an expected value corresponding to the N-th time interval, $W_N$ may represent a weight corresponding to the N-th time interval, $x_k$ may represent a vector of driving information output at the k-th time interval, $u_k$ may represent a vector of driving control amount output at the k-th time interval.

Step 3: calibrating the driving control amount according to the deviation information, to acquire the calibrated driving control amount.

In some embodiments, step 3 may include: determining a driving control amount that satisfies a minimum deviation value of the deviation information, and determining the driving control amount of the minimum deviation value as the calibrated driving control amount.

This step may be understood as: determining deviation information that satisfies the minimum deviation value, and determining a driving control amount under the deviation information, and determining it as the calibrated driving control amount.

It is worth noting that if the deviation information satisfies the minimum deviation value, reliability of subsequently determined driving information at a time point based on the calibrated driving control amount is relatively high, leading to a technical effect of improving accuracy and reliability of the determined driving information at a time point.

In some embodiments, the cost function may be converted by quadratic programming (QP), to obtain a formula of an optimal driving control amount min J, and the optimal driving control amount may be solved, to obtain the optimal driving control amount, the optimal driving control amount is a driving control amount corresponding to a deviation information that satisfies the minimum deviation value, that is, the calibrated driving control amount, and the formula of the optimal driving control amount is as follows:

$$\min_u J = \frac{1}{2} u^T H u + g^T u + C$$

where g may represent a partial derivative vector of the cost function, Hu may represent a Hessian matrix corresponding to the vector of the driving control amount, and specifically may be obtained by taking a derivative of g, C is a preset constant.

Exemplarily, an approximate solution of H may be solved based on a BFGS method (BFGS), and the optimal driving control amount may be solved based on a semi-smooth newton method or an effective set method. Where for principles of the BFGS method, the semi-smooth Newton method, and the effective set, reference may be made to related technology, which will not be repeated herein in detail.

It is worth noting that in the present embodiment, by technical solutions of steps 1 to step 3 above, that is, by a solution of determining the trajectory to be matched, determining deviation information based on the trajectory to be matched, and calibrating the driving control amount based on the deviation information, the calibrated driving control amount may be made to satisfy a current driving state and requirement of the vehicle, and a technical effect of improving driving safety and reliability of the vehicle is realized.

S304: determining the driving path between the adjacent driving time points based on the calibrated driving control amount.

In some embodiments, S304 may include the following steps:

step 1: reacquiring the driving information at the second time point according to the calibrated driving control amount and the driving information at the first time point.

After obtaining the calibrated driving control amount, the driving information at the second time point may be recalculated based on the calibrated driving control amount, to improve accuracy and reliability of the driving information at the second time point.

Step 2: acquiring the driving path between the first time point and the second time point according to the driving information at the first time point and the reacquired driving information at the second time point.

It is worth noting that in the present embodiment, by determining the driving path between two time points (which are adjacent driving time points) based on the driving information at the first time point and the reacquired driving information at the second time point, that is, based on the driving information at the two time points (which are adjacent driving time points), the determined driving path being highly fitted with the driving state of the vehicle and so on may be improved, and reliability and accuracy of the driving path may be improved, which in turn, realizing a technical effect of safety and reliability when the vehicle is driving based on the driving path.

In some embodiments, the driving information at the time point includes: an angle and a speed at the time point, and a distance between the vehicle and a pre-configured reference line at the time point, step 2 may include: generating a driving trajectory between the first time point and the reacquired second time point according to respective corresponding angles and speeds at the first time point and the reacquired second time point, and distances between the vehicle and the reference line at the time points.

In other words, this step may be understood as: generating a driving trajectory between the first time point and the reacquired second time point according to an angle and an speed at the first time point, a distance between the vehicle and the reference line at the first time point, and an angle and the speed at the reacquired second time point, a distance between the vehicle and the reference line at the reacquired second time point.

Exemplarily, the distance between each driving time point and the reference line may be understood as a distance between a driving time point on the trajectory to be matched and the reference line when each driving time point corresponds to the trajectory to be matched.

In one example, based on the above parameters, position information at the first time point and position information at the reacquired second time point may be determined, and a curve between the two time points may be fitted based on the position information at the two time points, to obtain a driving trajectory between the two time points.

In another example, based on the above parameters, an interpolation operation may be performed between the first time point and the reacquired second time point, and angles and speeds at the time points obtained by the interpolation operation, and distances between the vehicle and the reference lines at the time points may be determined, and a fit process is performed, to obtain a curve, and the obtained curve is the driving trajectory between the first time point and the reacquired second time point.

It is worth noting that in the present embodiment, by determining the driving path between the first time point and the reacquired second time point based on the above parameters, the determined driving path may be made to be highly reliable and accurate, then a technical effect of improving driving safety and reliability of the vehicle when the vehicle is driving based on the driving path may be realized.

S305: controlling the driving of the vehicle according to the driving path.

In some embodiments, S305 may include: splicing driving trajectories of each time period to be driven of the preset driving time period, and controlling the driving of the vehicle based on the spliced trajectories.

In conjunction with the application scenario as shown in FIG. 2 and the above example, when 5 driving trajectories within 5 seconds (that is, the driving time period) have been generated, the 5 driving trajectories are successively spliced, to obtain driving trajectories within the 5 seconds, and the driving of the vehicle is controlled based on the driving trajectories within the 5 seconds.

It is worth noting that in the present embodiment, for adjacent driving time points, by determining the driving information at the second time point according to the driving information at the first time point and the control amount, the driving information between the adjacent driving time points are made to be highly related, and highly fitted, thereby improving reliability and accuracy of the driving trajectory between the first time point and the second time point, which in turn realizing a technical effect of a safe and reliable controlling of the driving of the vehicle.

Figure 4:
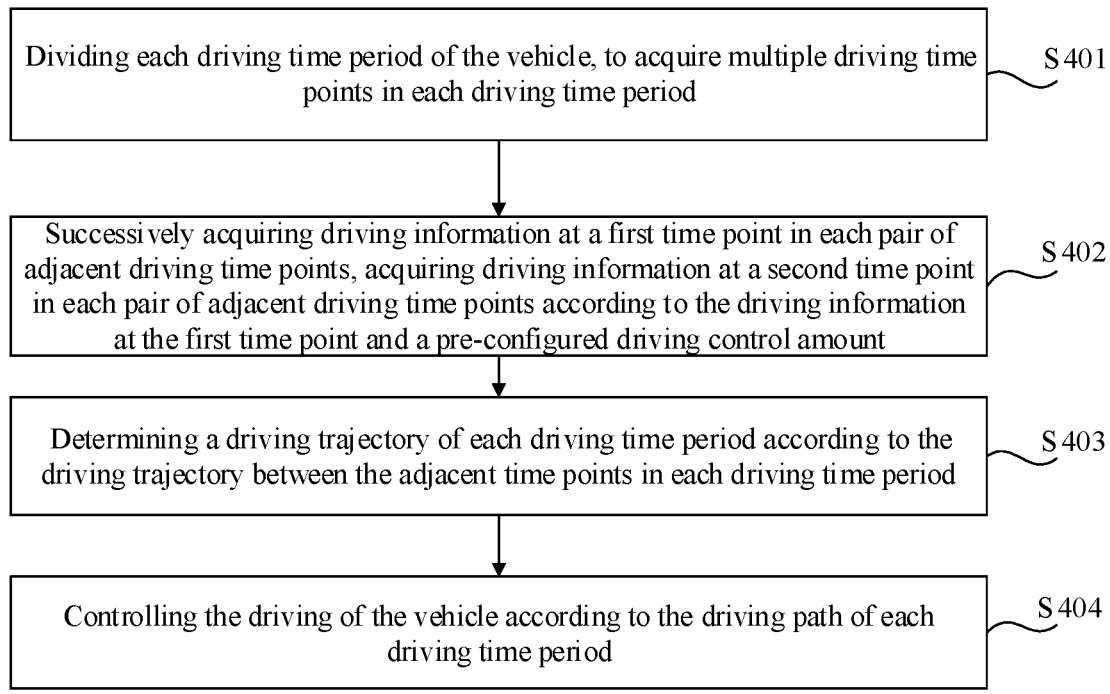
FIG. 4 is a schematic diagram according to a third embodiment of the present application.

FIG. 4 is a schematic diagram according to a third embodiment of the present application, as shown in FIG. 4, the vehicle driving control method provided in the present embodiment includes: S401: dividing each driving time period of the vehicle, to acquire multiple driving time points in each driving time period.

Exemplarily, for description of S401, reference may be made to S101, which will not be repeated herein in detail.

S402: successively acquiring driving information at a first time point in each pair of adjacent driving time points, acquiring driving information at a second time point in each pair of adjacent driving time points according to the driving information at the first time point and a pre-configured driving control amount.

Where the first time point is earlier than the second time point.

Exemplarily, for description of S402, reference may be made to the method for acquiring the driving information at the second time point in the adjacent driving time points in the first embodiment, may also be made to the method for acquiring the driving information at the second time point in the adjacent driving time points in the second embodiment, which will not be repeated herein in detail.

S403: calibrating the driving control amount according to the driving information at the first time point and the driving information at the second time point, and determining the driving path between the adjacent driving time points based on the calibrated driving control amount.

Exemplarily, for description of S403, reference may be made to the method for determining the driving path between the adjacent driving time points in the first embodiment, may also be made to the method for determining the driving path between the adjacent driving time points in the second embodiment, which will not be repeated herein in detail.

S403: determining a driving trajectory of each driving time period according to the driving trajectory between the adjacent time points in each driving time period.

S404: controlling the driving of the vehicle according to the driving path of each driving time period.

It is worth noting that, by determining driving information at each time point one by one on the basis of time, and determining driving trajectories of each driving time period in conjunction with all driving information, the driving trajectory of each driving time period may be made to have a technical effect of being highly reliable and accurate, thereby realizing a technical effect of the safe and reliable driving of the vehicle.

Figure 5:
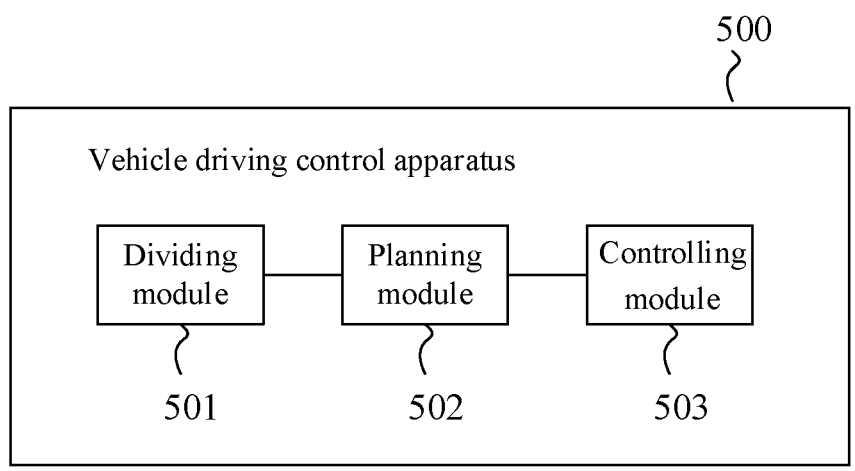
FIG. 5 is a schematic diagram according to a fourth embodiment of the present application.

FIG. 5 is a schematic diagram of a fourth embodiment according to the present application, as shown in FIG. 5, the vehicle driving control apparatus 500 provided in the present embodiment includes:

a dividing module 501, configured to divide a preset driving time period of the vehicle, to acquire multiple driving time points.

A planning module 502, configured to successively plan a driving path between adjacent driving time points, to obtain the driving path between the adjacent driving time points.

A controlling module 503, configured to control the driving of the vehicle according to the driving path.

Where the planning module 502 is configured to, acquire driving information at a first time point in the adjacent driving time points, acquire driving information at a second time point in the adjacent driving time points according to the driving information at the first time point and a pre-configured driving control amount; where the first time point is earlier than the second time point; calibrate the driving control amount according to the driving information at the first time point and the driving information at the second time point, and determine the driving path between the adjacent driving time points based on the calibrated driving control amount.

In some embodiments, the planning module 502 is configured to calibrate the driving control amount according to the driving information at the first time point, the driving information at the second time point, and a pre-configured reference line, to acquire the calibrated driving control amount.

In some embodiments, the planning module 502 is configured to, determine a trajectory to be matched corresponding to the driving information at the first time point and the driving information at the second time point; determine deviation information between the reference line and the trajectory to be matched; calibrate the driving control amount according to the deviation information, to acquire the calibrated driving control amount.

In some embodiments, the planning module 502 is configured to, determine a distance between the trajectory to be matched and the reference line; determine the deviation information according to the driving control amount and the distance between the trajectory to be matched and the reference line.

In some embodiments, the planning module 502 is configured to, calculate a trajectory prediction value between the adjacent time points according to the driving control amount and the distance between the trajectory to be matched and the reference line; determine the deviation information according to the trajectory prediction value and a preset expected value corresponding to the reference line.

In some embodiments, the planning module 502 is configured to, determine a driving control amount that satisfies a minimum deviation value of the deviation information as the calibrated driving control amount; and determine the driving path between the adjacent driving time points based on the driving control amount of the minimum deviation value.

In some embodiments, the planning module 502 is configured to, reacquire driving information at the second time point according to the calibrated driving control amount and the driving information at the first time point; acquire the driving path between the adjacent time points according to the driving information at the first time point and the driving information at the reacquired second time point.

In some embodiments, the driving information at the time points all includes: an angle and a speed at the time point, and a distance between the vehicle and the pre-configured reference line at the time point; the planning module 12 is configured to generate a driving trajectory between the first time point and the second time point according to respective corresponding angles and speeds at the first time point and the second time point, and distances between the vehicle and the reference line at the time points.

And the controlling module 503 is configured to, splice driving trajectories of each time period to be driven of the preset driving time period, and control the driving of the vehicle based on the spliced trajectories.

In some embodiments, the planning module 502 is configured to, acquire parameter attribute information of the vehicle, where the parameter attribute information characterizes a physical property of the vehicle; determine the driving information at the second time point according to the driving information at the first time point, the driving control amount, and the parameter attribute information.

In some embodiments, driving information at the time point includes: a speed and an angle of the vehicle at the time point; the driving control amount includes: a steering wheel angle control amount and an acceleration control amount; the planning module 502 is configured to, determine an angle at the second time point according to the parameter attribute information, a speed at the first time point, and the steering wheel angle control amount; determine an acceleration at the second time point according to the acceleration control amount; determine an speed at the second time point according to the speed at the first time point, an angle at the first time point, and the acceleration at the second time point.

According to an embodiment of the present application, the present application also provides an electronic device and a readable storage medium.

Exemplarily, the electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components, their connections and relationships, and their functions shown herein are merely examples, and are not intended to limit the implementation of the present application described and/or claimed herein.

Figure 6:
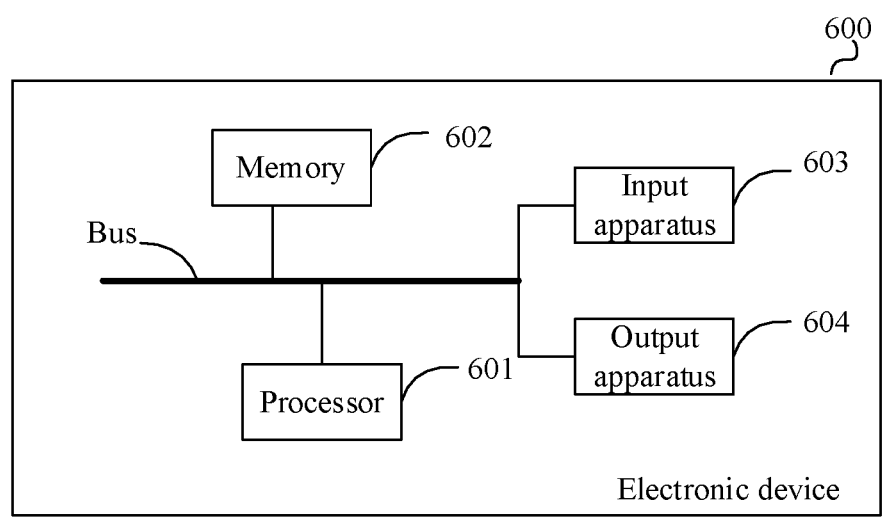
FIG. 6 is a schematic diagram according to a fifth embodiment of the present application.

FIG. 6 is a schematic diagram according to a fifth embodiment of the present application, as shown in FIG. 6, the electronic device 600 includes: one or more processors 601, a memory 602, and interfaces for connecting various components, where the interfaces include a high-speed interface and a low-speed interface. Various components are connected with each other by using different buses, and may be installed on a common motherboard or be installed in other ways as required. The processor may process an instruction executed in the electronic device, including an instruction stored in or on the memory to display graphical information of GUI on an external input/output apparatus (such as, a display device coupled to an interface). In other embodiments, if necessary, multiple processors and/or multiple buses may be used with multiple memories together. Likewise, multiple electronic devices may be connected, and each device provides part of necessary operations (e.g., as a server array, a group of blade servers, or a multi-processor system). In FIG. 6, one processor 601 is taken as an example.

The memory 602 is a non-transitory computer-readable storage medium provided by the present application. Where the memory stores an instruction executable by at least one processor to enable the at least one processor to execute the path planning method provided by the present application. The non-transitory computer-readable storage medium of the present application stores a computer instruction, and the computer instruction is used to enable the computer to execute the path planning method provided by the present application.

As a non-transitory computer-readable storage medium, the memory 602 may be used to store a non-transitory software program, a non-transitory computer-executable program, and a module, such as a program instruction/a module corresponding to the path planning method in the embodiments of the present application. By running the non-transitory software program, the instruction, and the module stored in the memory 602, the processor 601 executes various functional applications and data processing of the server, that is, realizes the path planning method in the above method embodiments.

The memory 602 may include a storage program area and a storage data area, where the storage program area may store an operating system and an application program required by at least one function; the storage data area may store data created according to a usage of the electronic device 600 for the path planning method, and so on. In addition, the memory 602 may include a high-speed random access memory, may also include a non-transitory memory, for example at least one magnetic disk storage device, a flash memory device, or other non-transitory solid-state storage devices. In some embodiments, the memory 602 may optionally include memories remotely located from the processor 601, and these remote memories may be connected to the electronic device 600 for the path planning method through a network. Instances of the above networks include, but are not limited to, an internet, a corporate intranet, a local area network, a mobile communication network, and combinations thereof.

The electronic device 600 for the path planning method may further include: an input apparatus 603 and an output apparatus 604. The processor 601, the memory 602, the input apparatus 603, and the output apparatus 604 may be connected by a bus or in other ways, in FIG. 6, a connection by a bus is taken as an example.

The input apparatus 603 may receive inputted numeric or character information, and generate key signal input related to user setting and function controlling of the electronic device 600 for the path planning method, where the input apparatus is, for example, a touch screen, a keypad, a mouse, a trackpad, a touch pad, a pointing stick, one or more mouse buttons, a trackball, a joystick, and so on. The output apparatus 604 may include a display device, an auxiliary lighting apparatus (e.g., LED), and a tactile feedback apparatus (e.g., a vibration motor), and so on. The display device may include, but is not limited to, a liquid crystal display (LCD), a light emitting diode (LED) display, and a plasma display. In some embodiments, the display device may be a touch screen.

The technical solution according to the present application: that is, dividing a preset driving time period of a vehicle, to acquire multiple driving time points, successively planning a driving path between adjacent driving time points, to acquire the driving path between the adjacent driving time points, and controlling the driving of the vehicle according to the driving path, where the planning the driving path between the adjacent driving time points includes: acquiring driving information at a first time point in the adjacent driving time points, acquiring driving information at a second time point in the adjacent driving time points according to the driving information at the first time point and a pre-configured driving control amount; where the first time point is earlier than the second time point, calibrating the driving control amount according to the driving information at the first time point and the driving information at the second point, and determining the driving path between the adjacent time points based on the calibrated driving control amount, makes driving information between the adjacent time points has a property of highly correlated and fitted, realizing a technical effect that accuracy and reliability of each of the determined driving information is improved, so that when the driving of the vehicle is controlled based on the driving trajectory, the driving safety of the vehicle is improved.

Various embodiments of the system and the technology described herein may be implemented in a digital electronic circuit system, an integrated circuit system, an application specific ASIC (application specific integrated circuit), a computer hardware, a firmware, software, and/or combinations thereof. These various embodiments may include: being implemented in one or more computer programs, where the one or more computer programs may be executed and/or interpreted on a programmable system including at least one programmable processor, the programmable processor may be a dedicated or general-purpose programmable processor that may receive data and an instruction from a storage system, at least one input apparatus, and at least one output apparatus, and transmit data and an instruction to the storage system, the at least one input apparatus, and the at least one output apparatus.

These computer programs (also be referred to as programs, software, software applications, or codes) include a machine instruction for a programmable processor, and these computer programs may be implemented by utilizing a high-level process and/or object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) used to provide a machine instruction and/or data to a programmable processor, and include a machine-readable medium that receives a machine instruction served as machine-readable signals. The term "machine-readable signal" refers to any signal used to provide a machine instruction and/or data to a programmable processor.

In order to provide interaction with a user, the system and the technology described herein may be implemented on a computer, where the computer is equipped with: a display apparatus (e.g., CRT (cathode ray tube) or LCD (liquid crystal display) monitor) for displaying information to the user; and a keyboard and a pointing apparatus (e.g., a mouse or a trackball) through which the user may provide input to the computer. Other types of apparatuses may also be used to provide interaction with the user; for example, a feedback provided to the user may be any form of sensory feedback (e.g., visual feedback, auditory feedback, or tactile feedback); and any form (including acoustic input, voice input, or tactile input) may be adopted to receive input from the user.

The system and the technology described herein may be implemented in a computing system (e.g., as a data server) that includes a back-end component, or a computing system (e.g., an application server) that includes a middleware component, or a computing system (e.g., a user computer with a graphical user interface or a web browser, the user may interact with the embodiments of the system and the technology described herein through the graphical user interface or the web browser) that includes a front-end component, or a computing system that includes any combination of such back-end component, intermediate component, or front-end component. Components of the system may be connected to each other through digital data communication (e.g., a communication network) in any form or medium. Examples of the communication network include: a local area network (LAN), a block-chain-based service network (BSN), a wide area network (WAN), and an internet.

A computer system may include a client and a server. The client and the server are generally far away from each other and usually interact with each other through a communication network. A relationship between the client and the server is generated by computer programs that run on corresponding computers and have a client-server relationship with each other. The server may be a cloud server, also known as a cloud computing server or a cloud host, which is a host product in a cloud computing service system, to solve defects of management difficulty high and business scalability weak existing in services of a traditional physical host and a virtual private server (VPS).

According to another aspect of an embodiment of the present application, the embodiment of the present application also provide a vehicle that includes the vehicle driving control apparatus described in the fourth embodiment above, or includes the electronic device described in the fifth embodiment above.

It should be understood that various forms of processes shown above may be used, and steps may be reordered, added or deleted. For example, each of the steps described in the present application may be performed in parallel, may also be performed sequentially, or may also be performed in a different order, as long as a desired result of the technical solution disclosed in the present application may be realized, which is not limited herein.

The above specific embodiments do not constitute a limitation to the protection scope of the present application. Those skilled in the art should understand that various modifications, combinations, sub-combinations and substitutions may be made according to design requirements and other factors. Any modification, equivalent replacement, improvement and so on made within the spirit and the principle of the present application shall be included in the protection scope of the present application.

What is claimed is:

1. A vehicle driving control method, comprising:
   dividing a preset driving time period of a vehicle, to acquire multiple driving time points;
   successively planning a driving path between adjacent driving time points, to acquire the driving path between the adjacent driving time points, and controlling a driving of the vehicle according to the driving path;
   wherein the planning the driving path between the adjacent driving time points comprises:
   acquiring driving information at a first time point in the adjacent driving time points, acquiring driving information at a second time point in the adjacent driving time points according to the driving information at the first time point and a pre-configured driving control amount; wherein the first time point is earlier than the second time point;
   calibrating the driving control amount according to the driving information at the first time point and the driving information at the second time point, and determining the driving path between the adjacent driving time points based on the calibrated driving control amount.

2. The method according to claim 1, wherein the calibrating the driving control amount according to the driving information at the first time point and the driving information at the second time point comprises:
   calibrating the driving control amount according to the driving information at the first time point, the driving information at the second time point, and a pre-configured reference line, to acquire the calibrated driving control amount.

3. The method according to claim 2, wherein the calibrating the driving control amount according to the driving information at the first time point, the driving information at the second time point, and the pre-configured reference line, to acquire the calibrated driving control amount, comprises:
   determining a trajectory to be matched corresponding to the driving information at the first time point and the driving information at the second time point;
   determining deviation information between the reference line and the trajectory to be matched;

calibrating the driving control amount according to the deviation information, to acquire the calibrated driving control amount.

4. The method according to claim 3, wherein the determining the deviation information between the reference line and the trajectory to be matched comprises:
   determining a distance between the trajectory to be matched and the reference line;
   determining the deviation information according to the driving control amount and the distance between the trajectory to be matched and the reference line.

5. The method according to claim 4, wherein the determining the deviation information according to the driving control amount and the distance between the trajectory to be matched and the reference line comprises:
   calculating a trajectory prediction value between the adjacent driving time points according to the driving control amount and the distance between the trajectory to be matched and the reference line;
   determining the deviation information according to the trajectory prediction value and a preset expected value corresponding to the reference line.

6. The method according to claim 4, wherein the calibrating the driving control amount according to the deviation information, to acquire the calibrated driving control amount, comprises: determining a driving control amount that satisfies a minimum deviation value of the deviation information as the calibrated driving control amount;
   and the determining the driving path between the adjacent driving time points based on the calibrated driving control amount comprises: determining the driving path between the adjacent driving time points based on the driving control amount of the minimum deviation value.

7. The method according to claim 1, wherein the determining the driving path between the adjacent driving time points based on the calibrated driving control amount comprises:
   reacquiring the driving information at the second time point according to the calibrated driving control amount and the driving information at the first time point;
   acquiring the driving path between the adjacent driving time points according to the driving information at the first time point and the reacquired driving information at the second time point.

8. The method according to claim 7, wherein the driving information at the time points comprises: an angle and a speed at the time point, and a distance between the vehicle and a pre-configured reference line at the time point; the acquiring the driving path between the adjacent driving time points according to the driving information at the first time point and the reacquired driving information at the second time point comprises:
   generating a driving trajectory between the first time point and the reacquired second time point according to respective corresponding angles and speeds at the first time point and the reacquired second time point, and distances between the vehicle and the reference line at the time points;
   and the controlling the driving of the vehicle according to the driving path comprises: splicing driving trajectories of each time period to be driven of the preset driving time period, and controlling the driving of the vehicle based on the spliced trajectories.

9. The method according to claim 1, wherein the acquiring driving information at the second time point in the adjacent driving time points according to the driving information at the first time point and the pre-configured driving control amount comprises:
   acquiring parameter attribute information of the vehicle, wherein the parameter attribute information characterizes a physical property of the vehicle;
   determining the driving information at the second time point according to the driving information at the first time point, the driving control amount, and the parameter attribute information.

10. The method according to claim 9, wherein the driving information at the time point comprises: a speed and an angle of the vehicle at the time point; the driving control amount comprises: a steering wheel angle control amount and an acceleration control amount; the determining the driving information at the second time point according to the driving information at the first time point, the driving control amount, and the parameter attribute information comprises:
    determining an angle at the second time point according to the parameter attribute information, a speed at the first time point, and the steering wheel angle control amount;
    determining an acceleration at the second time point according to the acceleration control amount;
    determining a speed at the second time point according to the speed at the first time point, an angle at the first time point, and the acceleration at the second time point.

11. A vehicle driving control electronic device, comprising: at least one processor and a memory communicatively connected with the at least one processor; wherein the memory stores an instruction executable by the at least one processor, and the at least one processor, when executing the instruction, is configured to:
    divide a preset driving time period of a vehicle, to acquire multiple driving time points;
    successively plan a driving path between adjacent driving time points, to acquire the driving path between the adjacent driving time points;
    control a driving of the vehicle according to the driving path;
    wherein the at least one processor is further configured to, acquire driving information at a first time point in the adjacent driving time points, acquire driving information at a second time point in the adjacent driving time points according to the driving information at the first time point and a pre-configured driving control amount; wherein the first time point is earlier than the second time point; calibrate the driving control amount according to the driving information at the first time point and the driving information at the second time point, and determine the driving path between the adjacent driving time points based on the calibrated driving control amount.

12. The electronic device according to claim 11, wherein the at least one processor is configured to:
    calibrate the driving control amount according to the driving information at the first time point, the driving information at the second time point, and a pre-configured reference line, to acquire the calibrated driving control amount.

13. The electronic device according to claim 12, wherein the at least one processor is configured to, determine a trajectory to be matched corresponding to the driving information at the first time point and the driving information at the second time point; determine deviation information between the reference line and the trajectory to be matched;

calibrate the driving control amount according to the deviation information, to acquire the calibrated driving control amount.

14. The electronic device according to claim 13, wherein the at least one processor is configured to, determine a distance between the trajectory to be matched and the reference line; determine the deviation information according to the driving control amount and the distance between the trajectory to be matched and the reference line.

15. The electronic device according to claim 14, wherein the at least one processor is configured to, calculate a trajectory prediction value between the adjacent driving time points according to the driving control amount and the distance between the trajectory to be matched and the reference line, and determine the deviation information according to the trajectory prediction value and a preset expected value corresponding to the reference line.

16. The electronic device according to claim 14, wherein the at least one processor is configured to, determine a driving control amount that satisfies a minimum deviation value of the deviation information as the calibrated driving control amount; determine the driving path between the adjacent driving time points based on the driving control amount of the minimum deviation value.

17. The electronic device according to claim 11, wherein the at least one processor is configured to, reacquire the driving information at the second time point according to the calibrated driving control amount and the driving information at the first time point; acquire the driving path between the adjacent driving time points according to the driving information at the first time point and the reacquired driving information at the second time point.

18. The electronic device according to claim 17, wherein the driving information at the time points comprises: an angle and a speed at the time point, and a distance between the vehicle and a pre-configured reference line at the time point; the at least one processor is configured to generate a driving trajectory between the first time point and the second time point according to respective corresponding angles and speeds at the first time point and the second time point, and distances between the vehicle and the reference line at the time points;

and the at least one processor is further configured to, splice driving trajectories of each time period to be driven of the preset driving time period, and control the driving of the vehicle based on the spliced trajectories.

19. A vehicle, comprising: a vehicle driving control electronic device, wherein the electronic device comprises at least one processor and a memory communicatively connected with the at least one processor; the memory stores an instruction executable by the at least one processor, and the at least one processor, when executing the instruction, is configured to:

divide a preset driving time period of the vehicle, to acquire multiple driving time points;

successively plan a driving path between adjacent driving time points, to acquire the driving path between the adjacent driving time points;

control a driving of the vehicle according to the driving path;

wherein the at least one processor is further configured to, acquire driving information at a first time point in the adjacent driving time points, acquire driving information at a second time point in the adjacent driving time points according to the driving information at the first time point and a pre-configured driving control amount; wherein the first time point is earlier than the second time point; calibrate the driving control amount according to the driving information at the first time point and the driving information at the second time point, and determine the driving path between the adjacent driving time points based on the calibrated driving control amount.

20. A non-transitory computer-readable storage medium storing a computer instruction for enabling a computer to execute the following steps:

dividing a preset driving time period of a vehicle, to acquire multiple driving time points;

successively planning a driving path between adjacent driving time points, to acquire the driving path between the adjacent driving time points, and controlling a driving of the vehicle according to the driving path;

wherein the planning the driving path between the adjacent driving time points comprises:

acquiring driving information at a first time point in the adjacent driving time points, acquiring driving information at a second time point in the adjacent driving time points according to the driving information at the first time point and a pre-configured driving control amount; wherein the first time point is earlier than the second time point;

calibrating the driving control amount according to the driving information at the first time point and the driving information at the second time point, and determining the driving path between the adjacent driving time points based on the calibrated driving control amount.

* * * * *